United States Patent
Doan

(10) Patent No.: US 9,574,548 B2
(45) Date of Patent: Feb. 21, 2017

(54) METHOD AND SYSTEM FOR CONTROLLED SHUTDOWN OF WIND TURBINES

(71) Applicant: VESTAS WIND SYSTEMS A/S, Aarhus N (DK)

(72) Inventor: Duy Duc Doan, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 5 days.

(21) Appl. No.: 14/362,027

(22) PCT Filed: Dec. 7, 2012

(86) PCT No.: PCT/DK2012/050454
§ 371 (c)(1),
(2) Date: May 30, 2014

(87) PCT Pub. No.: WO2013/083139
PCT Pub. Date: Jun. 13, 2013

(65) Prior Publication Data
US 2014/0339829 A1    Nov. 20, 2014

Related U.S. Application Data

(60) Provisional application No. 61/568,659, filed on Dec. 9, 2011.

(30) Foreign Application Priority Data

Dec. 8, 2011   (DK) ................................ 2011 70683

(51) Int. Cl.
*F03D 7/02*    (2006.01)
*H02P 3/18*    (2006.01)
(Continued)

(52) U.S. Cl.
CPC ........... *F03D 7/0296* (2013.01); *F03D 7/0244* (2013.01); *F03D 7/0264* (2013.01); *F03D 7/0272* (2013.01);
(Continued)

(58) Field of Classification Search
CPC ...... F03D 7/0244; F03D 9/003; F03D 7/0272; F03D 7/0296; F03D 7/0264; H02P 3/18; H02P 9/08
See application file for complete search history.

(56) References Cited

U.S. PATENT DOCUMENTS 5,798,631 A * 8/1998 Spee et al. ...................... 322/25
7,095,128 B2 * 8/2006 Canini et al. ................... 290/44
(Continued)

FOREIGN PATENT DOCUMENTS

DE   102004007461 A1   9/2005
EP       1863162 A2   12/2007
(Continued)

OTHER PUBLICATIONS

International Search Report for PCT/DK2012/050454, Nov. 7, 2013.
Danish Search Report for PA 2011 70683, Jun. 22, 2012.

*Primary Examiner* — Viet Nguyen
(74) *Attorney, Agent, or Firm* — Patterson + Sheridan, LLP

(57) ABSTRACT

The present invention relates to a method for controlled shutdown of wind turbines. The method involves using a generator side converter, and optionally a DC chopper, as a generator load during controlled shutdown. In this way gearbox back-lashing and drive train oscillations can be avoided. The present invention also relates to a wind turbine capable of performing controlled shutdown in accordance with the before-mentioned method.

20 Claims, 3 Drawing Sheets

(51) Int. Cl.
*F03D 9/00* (2016.01)
*H02P 9/08* (2006.01)

(52) U.S. Cl.
CPC .............. *F03D 9/003* (2013.01); *H02P 3/18* (2013.01); *H02P 9/08* (2013.01); *Y02E 10/723* (2013.01)

(56) References Cited

U.S. PATENT DOCUMENTS

| | | | |
|---|---|---|---|
| 7,605,488 B2 * | 10/2009 | Rebsdorf | 290/44 |
| 2002/0105189 A1 * | 8/2002 | Mikhail | F03D 7/0224 290/44 |
| 2007/0246943 A1 | 10/2007 | Chang et al. | |
| 2007/0279815 A1 * | 12/2007 | Li et al. | 361/54 |
| 2008/0296897 A1 * | 12/2008 | Kovach et al. | 290/44 |
| 2009/0008938 A1 * | 1/2009 | Erdman | H02P 9/007 290/44 |
| 2010/0040468 A1 | 2/2010 | Andersen et al. | |
| 2011/0140438 A1 * | 6/2011 | Delmerico et al. | 290/55 |
| 2012/0056424 A1 | 3/2012 | Holstein et al. | |

FOREIGN PATENT DOCUMENTS

| | | |
|---|---|---|
| WO | 00/76055 A1 | 12/2000 |
| WO | 2010/148062 A2 | 12/2010 |

\* cited by examiner

1

METHOD AND SYSTEM FOR CONTROLLED SHUTDOWN OF WIND TURBINES

FIELD OF THE INVENTION

The present invention relates to a method and a system for controlled shutdown of wind turbines. In particular, the present invention relates to a method and a system adapted to avoid backlashing of wind turbine gearboxes, drive train oscillations and similar unwanted effects.

BACKGROUND OF THE INVENTION

Wind turbine generator torque loads of today are typically implemented as passive resistors having fixed torque curves. If such resistive dump loads are applied as loads to a generator, wear and tear of the resistors and unnecessarily load on the wind turbine drive train often occur.

U.S. Pat. No. 7,605,488 discloses in general terms how to use dump loads for reducing backlashing in wind turbine gearboxes. Apparently, the amount of power being dissipated in dump loads in U.S. Pat. No. 7,605,488 is controlled by varying the degree of which the dump load is active, cf. for example column 3, line 10. Here it is explicitely specified that " . . . the dump load 5 is partly or fully activated . . . ". Thus, the amount of power being dissipated is varied by adjusting the capacity of the dump load.

It is a disadvantage of the system suggested in U.S. Pat. No. 7,605,448 that the capacity of the dump load can only be varied in discrete steps. This incremental change (increase or decrease) of the dump load capacity may accidentally induce events that may create load inversions in the gearbox.

It may be seen as an object of embodiments of the present invention to provide a method and a system that allow controlled shutdown of wind turbines so as to avoid backlashing of wind turbine gearboxes, drive train oscillations etc.

It may be seen as a further object of embodiments of the present invention to benefit from the controllability of a generator side converter to ensure controlled shutdown of wind turbines without introducing gearbox backlashing, drive train oscillations etc.

DESCRIPTION OF THE INVENTION

The above-mentioned objects are complied with by providing, in a first aspect, a method for shutting down a wind turbine comprising
  a power generator being connected to a set of rotatable rotor blades via a drive train,
  a power converter comprising generator side and grid side converters being separated by an intermediate DC circuit, and
  power dissipation or power storage device being operatively connected to the intermediate DC circuit
the method comprising the step of operating the generator side converter as a generator load in a manner so that the drive train torque has a constant direction during shutdown of the wind turbine.

The method according to the present invention is preferably applicable to full-scale wind turbine facilities where all the power generated by the power generator is passed through the power converter. The drive may optionally comprise a gearbox.

According to the first aspect of the present invention, if load inversion in the wind turbine gearbox is detected the generator side converter may be applied as a load to the generator. The load of the generator side converter may be applied in accordance with a power reference derived from a generator torque-speed curve.

If the load provided by the generator side converter is insufficient to maintain a drive train torque of a constant direction the method further comprises the step of dissipating or storing a controlled amount of excess power in the power dissipation or power storage device in a manner so that the drive train torque has a constant direction during shutdown of the wind turbine. Thus, if the load produced by the generator side converter is insufficient, the power dissipation or power storage device is activated and power is provided thereto in a manner controlled manner by the generator side converter. This may beneficially allow the power dissipation or power storage device to remove excess power from the system in a controlled manner without requiring complex controls, independent of the generator side converter controller, to regulate amounts of power passed to the power dissipation or power storage device.

The power dissipation or power storage device may include devices such as resistors, batteries, capacitors etc.

It is a general advantageous of the present invention that it facilitates a faster wind turbine shutdown. Moreover, it is more gentle to the wind turbine drive train. These advantages are achieved by having an active control scheme instead of a traditional passive control scheme. Moreover, the controlled shutdown of wind turbines may be performed with a partial functional power converter and in situations involving a grid fault.

In a second aspect the present invention relates to a wind turbine comprising
  a power generator being connected to a set of rotatable rotor blades via a drive train,
  a power converter comprising generator side and grid side converters being separated by an intermediate DC circuit, and
  power dissipation or power storage device being operatively connected to the intermediate DC circuit
wherein the generator side converter is adapted to be applied as a generator load in a manner so that the drive train torque has a constant direction during shutdown of the wind turbine.

Again, the load of the generator side converter may be applied in accordance with a power reference derived from a generator torque-speed curve.

Preferably, the wind turbine according to the second aspect is a full-scale wind turbine where all the power generated by the power generator is passed through the power converter. The drive train may optionally comprise a gearbox.

The power dissipation or power storage device may include devices such as resistors, batteries, capacitors etc.

The load of the generator side converter alone may be sufficient to maintain a constant drive train torque direction. If so the power dissipation or power storage device may be activated and thus receive an amount of excess power as controlled, at least partially, by the generator side converter so that the drive train torque has a constant direction during shutdown of the wind turbine.

BRIEF DESCRIPTION OF THE DRAWINGS

The present invention will now be explained in further details with reference to the following figures, wherein.

While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to a method and a system for controlled shutdown, also called rundown, of wind turbines. By controlled shutdown is meant that wind turbines can be closed down without introducing backlashing and other load inversion events in the drive train in general, and in wind turbine gearboxes in particular. By implementing the present invention wear and tear due to unnecessary loads on the drive train can be significantly reduced.

Figure 1:
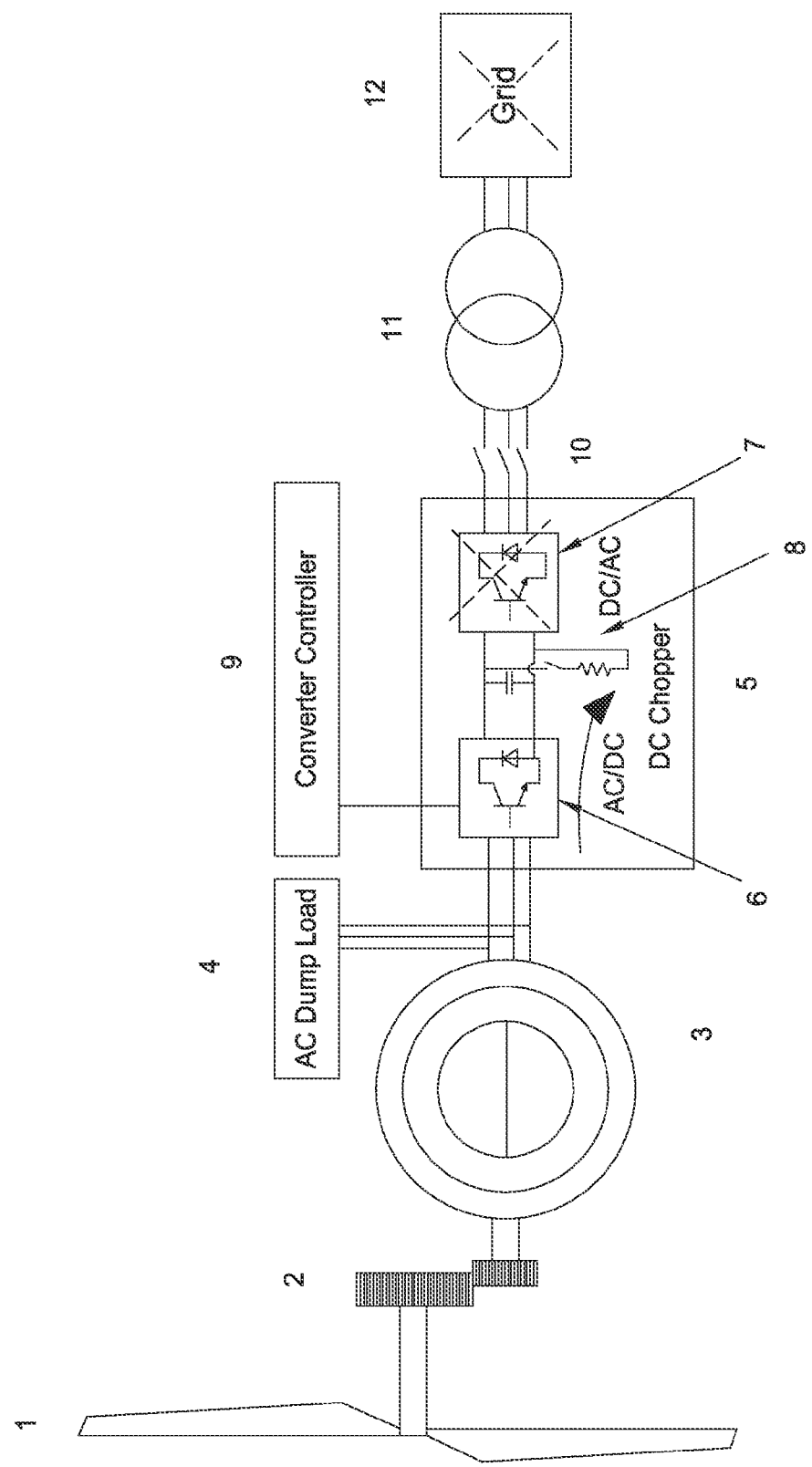
FIG. 1 illustrates a wind turbine.

Referring now to FIG. 1 a full-scale wind turbine facility is depicted. A set of rotatably mounted rotor blades 1 drives a rotor of the generator 3 through a drive train comprising a gearbox 2. An AC dump load 4 is connected to the generator 3 (e.g., a power stop). In an emergency situation the AC dump load 4 is activated and the wind turbine is brought to an immediate hold. It typically takes about 30 minutes for the AC dump load 4 to cool down after an emergency shutdown.

A power converter 5 comprising a generator side converter 6 and a grid side converter 7 is provided as well. The generator and grid side converters 6, 7 are separated by an intermediate DC circuit being operatively connected to a DC chopper 8. The DC chopper illustrated in FIG. 1 includes a resistive dump load. However, it may comprise power storage device in the form of one or more batteries and/or one or more capacitors as well. A converter controller 9 controls the overall operation of the power converter 5.

Generated AC power is fed to an associated AC grid 12 through a three-phase circuit breaker 10 and a grid transformer 11. The grid transformer 11 brings the converter voltage up to an appropriate grid voltage level.

In case of, for example, a sudden grid collapse and/or a grid side converter failure the drive train typically starts oscillating before the control system manages to shutdown the wind turbine. An oscillating drive train may induce uncontrollable backlashing in the wind turbine gearbox. However, if a constant direction of the drive train torque can be maintained during grid/grid side converter failure gearbox backlashing can be avoided.

According to the present invention the generator side converter 6 acts as an active, and thereby controllable, generator load during grid/grid side converter failure. Thus, by actively controlling the generator side converter 6 drive train oscillations and associated drive train load inversions may be avoided. If the generator power during shutdown exceeds the capacity of the generator side converter the DC chopper is activated and excess power is dissipated or stored therein.

Figure 2:
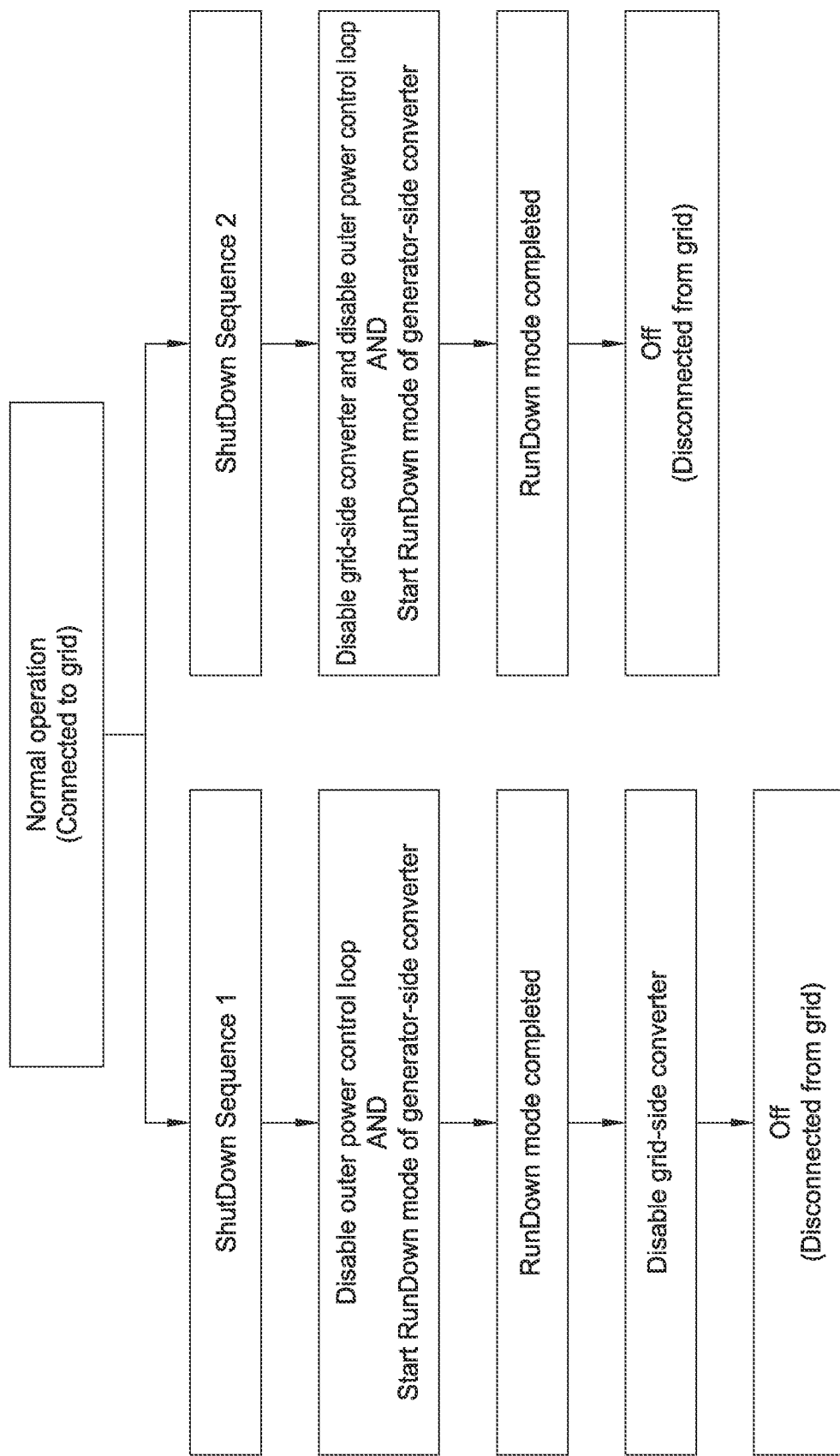
FIG. 2 shows a flow-chart of two shutdown schemes.

Two different types of controlled shutdown sequences are illustrated in FIG. 2, namely: "ShutDown Sequence 1" and "ShutDown Sequence 2". Both shutdown sequences terminate with a disconnection of the wind turbine from the grid, i.e. a shutdown of both generator side and grid side converters. The choice of shutdown sequence depends on the type of fault detected. For example, if the grid side converter fails the ShutDown Sequence 2 is selected.

During normal operation a wind turbine is controlled by an outer power control loop where the amount of active power (P) and the amount of reactive power (Q) fed into the grid are used as feedback parameters. During ShutDown Sequences 1 and 2 this outer P and Q power loop is disabled. Instead a torque vs. generator speed curve is introduced for controlling the generator side converter 6.

As depicted in FIG. 2 ShutDown Sequences 1 and 2 both comprise a RunDown mode sequence being applied to the generator side converter.

Referring now to the ShutDown Sequence 1 branch of FIG. 2 the RunDown mode on the generator side converter is performed while the grid side converter is active. This device that the DC link voltage level is monitored by the grid side converter and active (and/or reactive) power is fed to the grid in accordance with the DC link voltage.

In the ShutDown Sequence 2 branch of FIG. 2 the grid side converter is disabled and the DC chopper control is active, i.e. the DC chopper monitors the DC link voltage and is automatically activated if the DC link voltage increases above a nominal voltage level of the DC link.

The common RunDown mode sequence offers a gentle shutdown sequence that aims to protect the gearbox against backlashing during the speed ramp down by applying a positive torque to the drive train. When a RunDown mode request is received, the converter system changes state to "RunDown" while the RunDown mode is active. During the RunDown mode the generator is kept connected and controlled until the rotor speed becomes close to a lower speed limit. In this way, no negative torque, and thereby gearbox backlashing, is generated during speed reduction until zero power speed, where the generator is disconnected from the grid.

Before initiating the RunDown mode the actual power reference from outer power loop is set as a maximum power limit during the RunDown mode. Thus, the actual power reference is stored and applied to limit a maximum power reference during RunDown mode.

Figure 3:
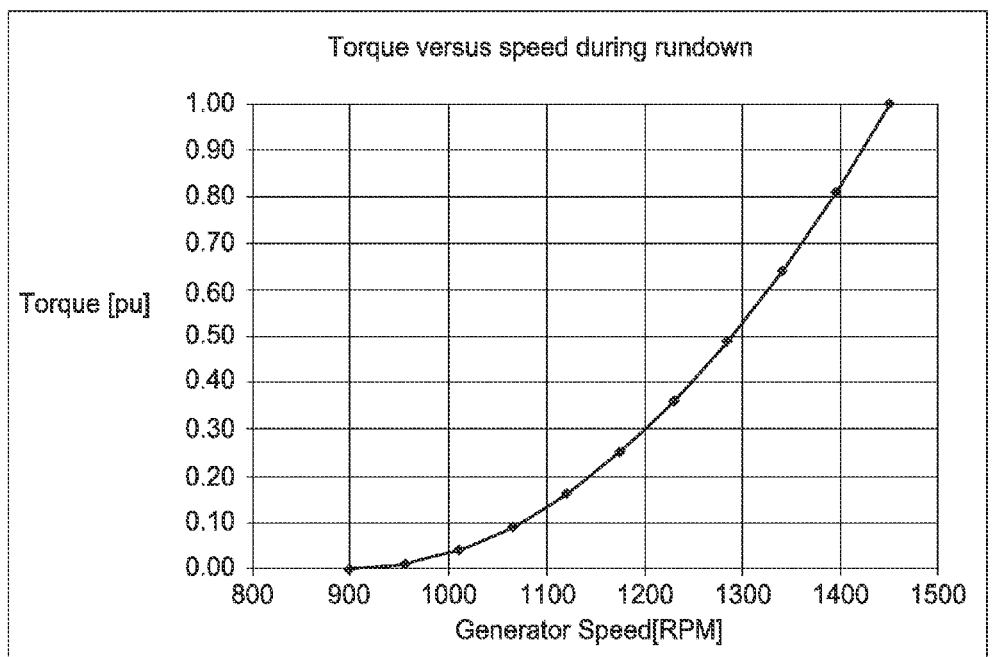
FIG. 3 shows a typical torque-speed curve used for setting power references during RunDown.

As previously mentioned the outer power loop is disabled meaning that the normal power reference to the generator side converter is no longer available. Instead the generator side converter is controlled by a new power reference derived from for example a torque-speed curve, i.e. torque vs. generator speed curve. An example of a torque-speed curve approximated by 11 points is shown in FIG. 3. Thus, with a disabled outer power loop a new power reference for the generator side converter is derived from the speed of the generator via a torque-speed curve.

It should be noted that the new power reference for the generator side converter may be derived from a polynomial equation as well.

What is claimed is:

1. A method for shutting down a wind turbine, the wind turbine comprising:
    a power generator connected to a set of rotatable rotor blades via a drive train,
    a power converter comprising a generator side converter and a grid side converter separated by an intermediate DC circuit, and
    at least one of power dissipation and power storage means operatively connected to the intermediate DC circuit,
    wherein the method comprises:
    operating the wind turbine according to a first operating mode, wherein the first operating mode comprises a power control loop having feedback parameters indicating an amount of active power and an amount of reactive power supplied to an associated grid, and in response to a request to shut down the wind turbine, performing a controlled shutdown of the wind turbine in a second operating mode, wherein the controlled shutdown comprises controlling an output of the generator side converter using a power reference derived from a predefined generator torque-speed curve so that torque of the drive train has a constant direction, wherein the generator is connected to the associated grid during the controlled shutdown of the wind turbine and wherein the predefined generator torque-speed curve is not used during the first operating mode and the power control loop is not used during the second operating mode.

2. A method according to claim 1, further comprising the step of dissipating or storing a controlled amount of excess power in the power dissipation or power storage means in a manner so that the drive train torque has a constant direction during the controlled shutdown of the wind turbine.

3. A method according to claim 1, the generator side converter is applied as a generator load when the drive train torque is below a predetermined limit.

4. A method according to claim 1, further comprising the step of setting the grid side converter in an inactive mode of operation.

5. A method according to claim 4, further comprising the step of disconnecting the wind turbine from the associated grid.

6. A method according to claim 5, wherein disconnecting the wind turbine from the associated grid comprises a shutdown of the generator side converter and a shutdown of the grid side converter.

7. A method according to claim 5, wherein the generator is disconnected from the associated grid upon the rotor speed reaching zero.

8. A wind turbine that comprises:
a power generator connected to a set of rotatable rotor blades via a drive train;
a power converter comprising a generator side converter and a grid side converter separated by an intermediate DC circuit;
at least one power dissipation and power storage means operatively connected to the intermediate DC circuit; and
a controller configured to:
operate the wind turbine according to a first operating mode, wherein the first operating mode comprises a power control loop having feedback parameters indicating an amount of active power and an amount of reactive power supplied to an associated grid, and
in response to a request to shut down the wind turbine, perform a controlled shutdown of the wind turbine in a second operating mode, wherein during the controlled shutdown an output of the generator side converter is controlled using a power reference derived from a predefined generator torque-speed curve so that torque of the drive train has a constant direction, wherein the generator is connected to the associated grid during the controlled shutdown of the wind turbine and wherein the predefined generator torque-speed curve is not used during the first operating mode and the power control loop is not used during the second operating mode.

9. A wind turbine according to claim 8, wherein the power dissipation or power storage means is adapted to receive a controlled amount of excess power so that the drive train torque has a constant direction during the controlled shutdown of the wind turbine.

10. A wind turbine according to claim 8, wherein the power dissipation or power storage means comprises a resistor, a capacitor or a battery.

11. A wind turbine according to claim 8, wherein the drive train comprises a gearbox.

12. A wind turbine according to claim 8, wherein the generator side converter is shut down and the grid side converter is shut down to disconnect the wind turbine from the associated grid.

13. A method according to claim 8, wherein the generator is disconnected from the associated grid upon the rotor speed reaching zero.

14. A wind turbine that comprises:
a power generator connected to a set of rotatable rotor blades via a drive train;
a power converter comprising a generator side converter and a grid side converter separated by an intermediate DC circuit;
at least one of power dissipation and power storage means operatively connected to the intermediate DC circuit; and
a controller configured to:
operate the wind turbine according to a first operating mode, wherein the first operating mode comprises a power control loop having feedback parameters indicating an amount of active power and an amount of reactive power supplied to an associated grid, and
in response to a request to shut down the wind turbine, perform a controlled shutdown of the wind turbine in a second operating mode, wherein the controlled shutdown comprises controlling an output of the generator side converter using a power reference derived from a predefined generator torque-speed curve so that torque of the drive train has a constant direction, wherein the predefined generator torque-speed curve is not used during the first operating mode and the power control loop is not used during the second operating mode.

15. A wind turbine according to claim 14, the controller further configured to:
dissipate or store a controlled amount of excess power in the power dissipation or power storage means in a manner so that the drive train torque has a constant direction during the controlled shutdown of the wind turbine.

16. A wind turbine according to claim 14, wherein the generator side converter is applied as a generator load when the drive train torque is below a predetermined limit.

17. A wind turbine according to claim 14, the controller further configured to:
set the grid side converter to an inactive mode of operation.

18. A wind turbine according to claim 17, the controller further configured to:
disconnect the wind turbine from the associated grid.

19. A wind turbine according to claim 18, wherein disconnecting the wind turbine from the associated grid comprises a shutdown of the generator side converter and a shutdown of the grid side converter.

20. A wind turbine according to claim 18, wherein the generator is disconnected from the associated grid upon the rotor speed reaching zero.

* * * * *